United States Patent
Nakama et al.

(10) Patent No.: US 12,260,544 B2
(45) Date of Patent: Mar. 25, 2025

(54) IMAGE RESTRICTION METHOD, RECORDING MEDIUM, INFORMATION PROCESSING APPARATUS, AND SUPPORT SYSTEM

(71) Applicant: Tokyo Electron Limited, Tokyo (JP)

(72) Inventors: Kazuhisa Nakama, Fuchu (JP);
Nobuyuki Ishibashi, Fuchu (JP);
Tatsuya Hirosawa, Fuchu (JP);
Masahiro Koyanagi, Fuchu (JP);
Nobuhiko Sasaki, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 368 days.

(21) Appl. No.: 17/804,669

(22) Filed: May 31, 2022

(65) Prior Publication Data

US 2022/0383472 A1    Dec. 1, 2022

(30) Foreign Application Priority Data

Jun. 1, 2021    (JP) .................................. 2021-092364

(51) Int. Cl.
*G06K 9/00*    (2022.01)
*G06T 7/00*    (2017.01)
(52) U.S. Cl.
CPC ................... *G06T 7/001* (2013.01)
(58) Field of Classification Search
None
See application file for complete search history.

(56) References Cited

U.S. PATENT DOCUMENTS

| | | | |
|---|---|---|---|
| 2017/0004602 A1* | 1/2017 | Le Jouan | G06T 5/70 |
| 2017/0169232 A1* | 6/2017 | Lelabourier | H04L 9/0656 |
| 2017/0289623 A1* | 10/2017 | Bailey | H04N 21/4542 |
| 2019/0042871 A1* | 2/2019 | Pogorelik | G06T 5/73 |
| 2022/0164560 A1* | 5/2022 | Heyman-Dewitte | G06V 20/46 |

FOREIGN PATENT DOCUMENTS

JP    2021-035002 A    3/2021

* cited by examiner

*Primary Examiner* — S J Park
(74) *Attorney, Agent, or Firm* — Armstrong Teasdale LLP

(57) ABSTRACT

An image restriction method includes: acquiring image data by a capturing part, the image data being obtained by capturing a space in which a monitoring target object is disposed; acquiring capturing position data indicating a capturing position of the capturing part in the space; acquiring shape information indicating a three-dimensional shape of the monitoring target object; specifying a disposition position of the monitoring target object in the space; specifying a shape of the monitoring target object disposed at the disposition position, based on the capturing position data, the shape information, and the disposition position, and specifying a region of the monitoring target object in an image of the acquired image data, based on a result obtained by the specifying the shape; performing a masking process on a region other than the specified region of the monitoring target object, in the image of the acquired image data; and outputting mask-processed image data.

20 Claims, 9 Drawing Sheets

IMAGE RESTRICTION METHOD, RECORDING MEDIUM, INFORMATION PROCESSING APPARATUS, AND SUPPORT SYSTEM

CROSS-REFERENCE TO RELATED APPLICATION

This application claims priority to Japanese Patent Application No. 2021-092364, filed on Jun. 1, 2021, the entire contents of which are incorporated herein by reference.

TECHNICAL FIELD

The present disclosure relates to an image restriction method, a non-transitory computer-readable recording medium recording an image restriction program, an information processing apparatus, and a support system.

BACKGROUND

In Patent Document 1, an image file in which an object related to confidential information is captured and an image file in which the object related to the confidential information is not captured are sorted. A technique of excluding the image file, in which the object related to the confidential information is captured, from a public target, and opening only the image file, in which the object related to the confidential information is not captured, to another person is disclosed.

PRIOR ART DOCUMENT

Patent Document

Patent Document 1: Japanese Laid-Open Patent Publication No. 2021-035002

SUMMARY

According to an aspect of the present disclosure, there is provided an image restriction method including: acquiring image data by a capturing part, wherein the image data is obtained by capturing a space in which a monitoring target object is disposed; acquiring capturing position data indicating a capturing position of the capturing part in the space when the monitoring target object is captured; acquiring shape information indicating a three-dimensional shape of the monitoring target object; specifying a disposition position of the monitoring target object in the space; specifying a shape of the monitoring target object disposed at the disposition position with the capturing position indicated by the capturing position data as a viewpoint position, based on the capturing position data, the shape information, and the disposition position of the monitoring target object, and specifying a region of the monitoring target object in an image of the acquired image data, based on a result obtained in the specifying the shape of the monitoring target object; performing a masking process on a region other than the specified region of the monitoring target object, in the image of the acquired image data; and outputting mask-processed image data processed in the performing the masking process.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Hereinafter, embodiments of an image restriction method, a non-transitory computer-readable recording medium recording an image restriction program, an information processing apparatus, and a support system disclosed in the present application will be described in detail with reference to the drawings. The image restriction method, the recording medium recording the image restriction program, the information processing apparatus, and the support system disclosed herein are not limited by the present embodiment. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In recent years, a support system that remotely supports an operation such as maintenance on a monitoring target object is demanded. For example, in the support system, an operator sends an image obtained by capturing the monitoring target object to a terminal apparatus at a remote location, and an instructor confirms the image with the terminal apparatus to support the operation of the operator. However, there is confidential information that the operator does not want to show to the instructor in the vicinity of the monitoring target object, and thus the image as captured may not be used.

Therefore, a technique of restricting an image such that a region other than a region of a monitoring target object is concealed is expected.

First Embodiment

[Schematic Configuration of Support System 10]

Figure 1:
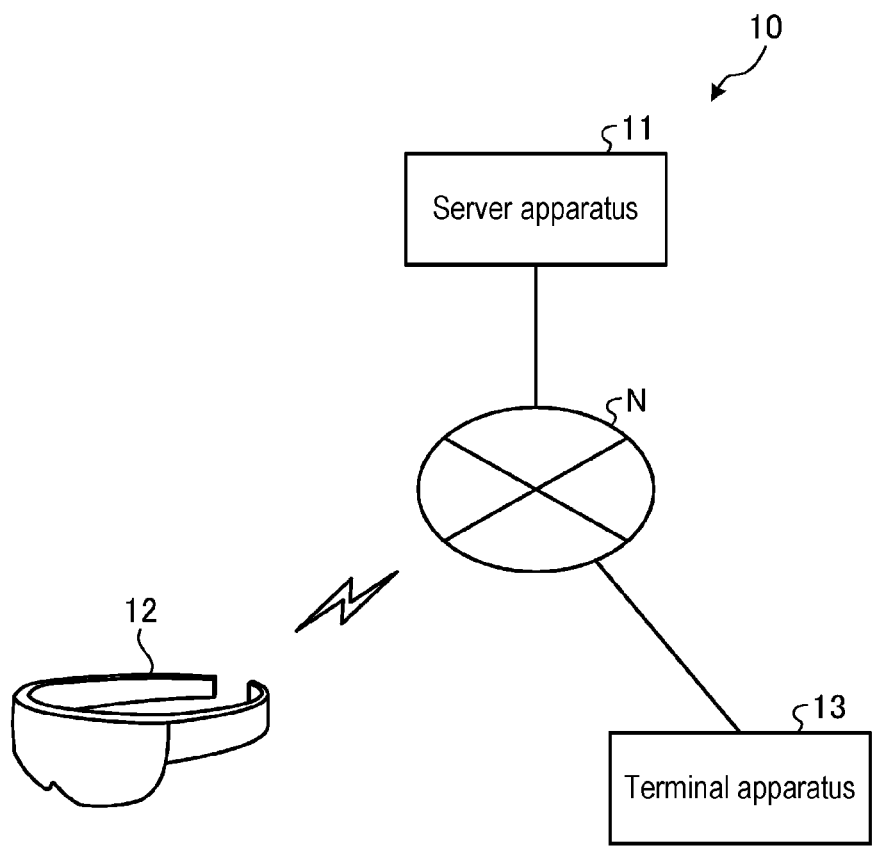
FIG. 1 is a diagram illustrating an example of a configuration of a support system according to a first embodiment.

FIG. 1 is a diagram illustrating an example of a configuration of a support system 10 according to a first embodiment. The support system 10 is a system that remotely supports an operation such as maintenance on a monitoring target object.

The support system 10 includes a server apparatus 11, an operator terminal 12, and a terminal apparatus 13. The server apparatus 11, the operator terminal 12, and the terminal apparatus 13 are connected to a network N, and can communicate with the network N. As an aspect of the network N, mobile communication such as a cellular phone, Internet, and any type of communication network such as a local area network (LAN) or a virtual private network (VPN) may be adopted, regardless of a wired or wireless manner.

The server apparatus 11 is an apparatus that provides a support function of remotely supporting an operation performed on the monitoring target object. The server apparatus 11 is, for example, a computer such as a server computer. The server apparatus 11 is provided, for example, in a data sensor or the like and a global IP address is assigned to the server apparatus 11, and the server apparatus 11 can be accessed by the terminal apparatus 13 and the operator terminal 12 via the network N. The server apparatus 11 is accessed by the terminal apparatus 13 and the operator terminal 12, and a support function is available by performing authentication of an account. The server apparatus 11 relays communications between the operator terminal 12 and the terminal apparatus 13 with the support function. For example, the operator terminal 12 designates an account for permitting communication, to the server apparatus 11. The server apparatus 11 relays communication between the operator terminal 12 and the terminal apparatus 13 of the account for which communication is permitted. In the present embodiment, the case where the server apparatus 11 is one computer is described as an example. Meanwhile, the server apparatus 11 may be implemented as a computer system using a plurality of computers.

The operator terminal 12 is an apparatus operated by an operator executing an operation on a monitoring target object. In the present embodiment, the operator terminal 12 is a wearable device that can be worn and used by the operator. For example, the operator terminal 12 is configured as a head-mounted display. The operator terminal 12 is mounted on a head of the operator. The operator terminal 12 visibly displays various types of information for the operator. The operator terminal 12 includes a transmissive display part in a lens portion to enable the operator to visually recognize an external real environment even when the operator is wearing the operator terminal 12. The operator terminal 12 causes the display part to display various types of information such as graphics, thereby superimposing and displaying various types of information on a target object viewed through the display part. The operator terminal 12 can realize augmented reality (AR) or mixed reality (MR) by superimposing and displaying various types of information on the viewed target object. The AR is a technique in which an apparatus adds information or the like to an image of an object existing in a real space, thereby expanding and expressing reality. The MR is a technique in which the apparatus changes the image of the object existing in the real space, and the apparatus combines an image of the changed object and an image of the object existing in a virtual space and represents the resultant image. The AR is based on the real world and expands the real world by combining reality and non-reality. Since the AR superimposes a virtual object in the real world, the virtual object is displayed only on the entire surface. The MR is based on the virtual space, recognizes the space, and fuses the virtual space and the real space. The MR may dispose the virtual object in the real space. The operator terminal 12 according to the present embodiment implements the MR.

Further, the operator terminal 12 is provided with a camera. An image in a front direction of the operator who wears the operator terminal 12 may be captured by the camera. The operator terminal 12 transmits the image captured by the camera to the terminal apparatus 13 via the server apparatus 11. Further, the operator terminal 12 displays the image received from the terminal apparatus 13 via the server apparatus 11 on the display part. As the operator terminal 12, for example, Hololens 2 (registered trademark) manufactured by Microsoft Corporation, U.S.A. may be used. The case where the operator terminal 12 is a wearable device is described as an example, but the present embodiment is not limited thereto. The operator terminal 12 may be a terminal such as a tablet or a notebook PC that can be used in hands. In the first embodiment, the operator terminal 12 corresponds to an information processing apparatus of the present disclosure.

The terminal apparatus 13 is an apparatus operated by an instructor who remotely instructs an operation on a monitoring target object. The terminal apparatus 13 is, for example, a computer such as a personal computer. The terminal apparatus 13 displays an image received from the operator terminal 12 via the server apparatus 11. The instructor transmits an operation instruction from the terminal apparatus 13 by an audio or an image.

[Configuration of Server Apparatus 11]

Figure 2:
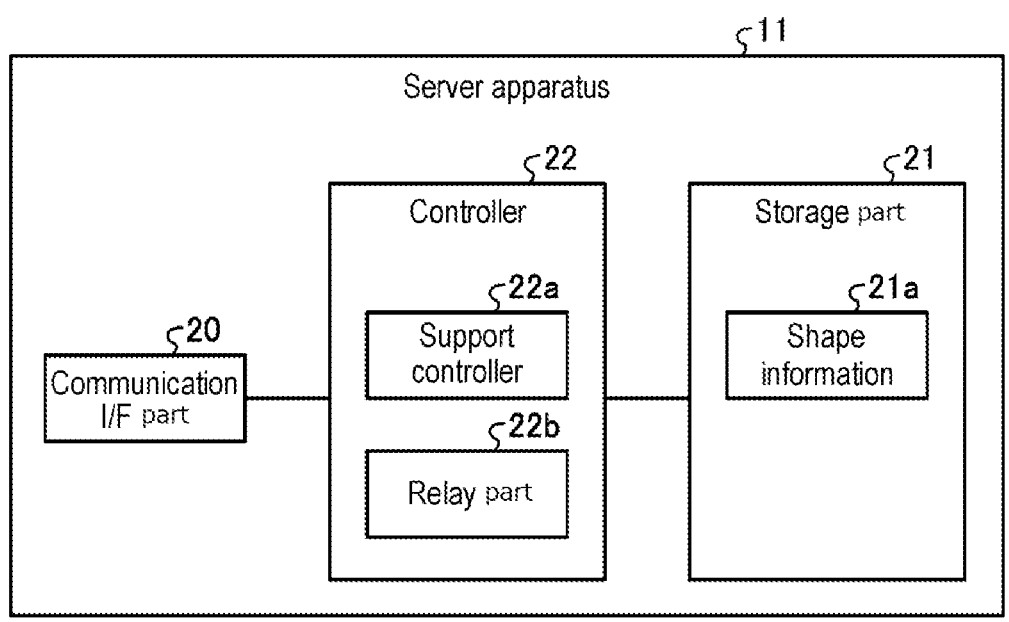
FIG. 2 is a diagram illustrating an example of a functional configuration of a server apparatus according to the first embodiment.

Next, a configuration of each device will be described. First, a configuration of the server apparatus 11 will be described. FIG. 2 is a diagram illustrating an example of a functional configuration of the server apparatus 11 according to the first embodiment. The server apparatus 11 includes a communication interface (I/F) part 20, a storage part 21, and a controller 22. The server apparatus 11 may include another device included in a computer, in addition to the devices described above.

The communication I/F part 20 is an interface that performs communication control with other apparatuses. The communication I/F part 20 is connected to the network N, and transmits and receives various types of information to and from the terminal apparatus 13 and the operator terminal 12 via the network N.

The storage part 21 is a storage apparatus such as a hard disk, an SSD, or an optical disc. The storage part 21 may be a semiconductor memory capable of rewriting data such as a RAM, a flash memory, or an NVSRAM.

The storage part 21 stores an operating system (OS) or various programs to be executed by the controller 22. Further, the storage part 21 stores various types of data to be used in the program executed by the controller 22. For example, the storage part 21 stores shape information 21a.

The shape information 21a is data storing a three-dimensional shape of a monitoring target object. Details of the shape information 21a will be described below.

The controller 22 is a device that controls the server apparatus 11. As the controller 22, an electronic circuit such as a CPU or an MPU, or an integrated circuit such as an ASIC or an FPGA may be adopted. The controller 22 includes an internal memory for storing programs or control data defining various process procedures, and executes various processes by these internal memories. The controller 22 functions as various processors by operating the various programs. For example, the controller 22 includes a support controller 22a and a relay part 22b.

The support controller 22a is a processor that performs control related to a support function. When accepting an access, the support controller 22a inputs account information to an access source and authenticates an account. For example, the support controller 22a authenticates the account when accepting the access from the terminal apparatus 13 and the operator terminal 12. When the correct account is authenticated, the support controller 22a provides various operation screens of the support function to the access source, and accepts an operation of the support function from the operation screen. For example, an account for permitting communication is designated to the support controller 22a from the terminal apparatus 13.

The relay part 22b relays communication between the operator terminal 12 and the terminal apparatus 13 of the account for which communication is permitted.

[Configuration of Operator Terminal 12]

Figure 3:
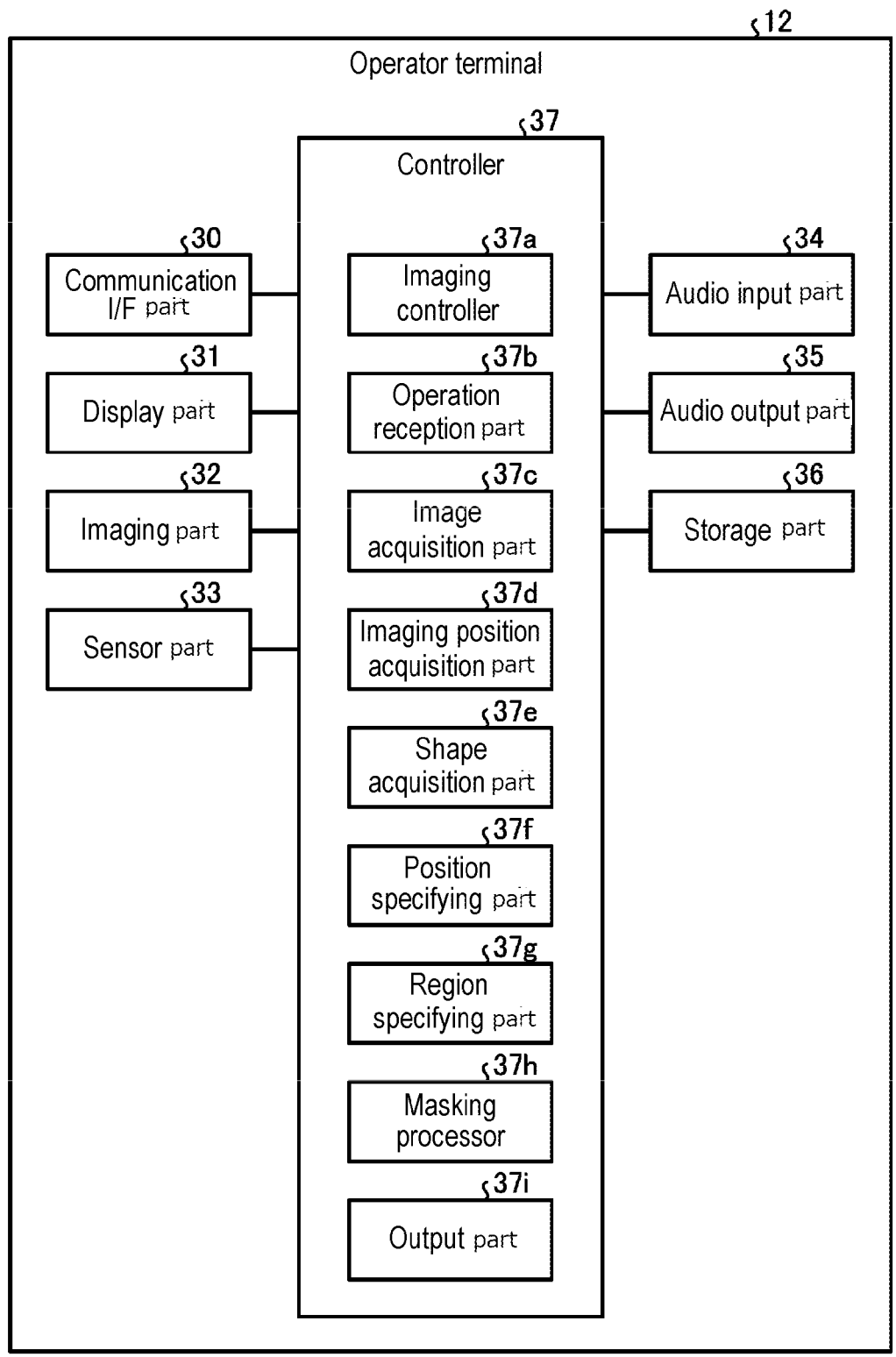
FIG. 3 is a diagram illustrating an example of a functional configuration of an operator terminal according to the first embodiment.

Next, a configuration of the operator terminal 12 will be described. FIG. 3 is a diagram illustrating an example of a functional configuration of the operator terminal 12 according to the first embodiment. As described above, the operator terminal 12 is configured as a head-mounted display. The operator terminal 12 includes a communication I/F part 30, a display part 31, a capturing part 32, a sensor part 33, an audio input part 34, an audio output part 35, a storage part 36, and a controller 37. The operator terminal 12 may include another device other than the devices described above.

The communication I/F part 30 is an interface that performs communication control with other apparatuses. The communication I/F part 30 is connected to the network N through radio communication, and transmits and receives various types of information to and from other apparatuses via the network N.

The display part 31 is a device that displays various types of information. The display part 31 is provided in the operator terminal 12 to face eyes of a user when the user wears the operator terminal 12. The display part 31 has transparency for the user to visually recognize an external real environment even when the user wears the operator terminal 12. The display part 31 displays various types of information under control of the controller 37. For example, the display part 31 displays an image transmitted from the server apparatus 11. In the present embodiment, the display part 31 is configured to support both eyes. Alternatively, the display part 31 may be configured to support only one eye.

Under the control of the controller 37, the capturing part 32 captures the surroundings of the operator terminal 12 to generate an image. The capturing part 32 includes a camera. For example, the capturing part 32 includes the camera facing a front direction of the user wearing the operator terminal 12. The camera may be a 3D camera, may be a stereo-type camera in which at least two cameras are disposed at given intervals, or may be a time of flight (ToF) type camera. The capturing part 32 may respectively include the stereo-type and ToF-type 3D cameras. Further, the capturing part 32 may include a plurality of cameras that capture images of the surroundings of the operator terminal 12. The capturing part 32 captures an image by a camera, and outputs image data of the captured image to the controller 37.

The sensor part 33 includes a sensor device such as an acceleration sensor, a gyro sensor, and an azimuth sensor, and has a function of sensing information to be used for processes in the controller 37.

The audio input part 34 includes a microphone that inputs an audio and converts the audio into an electric signal, and generates audio data by performing analog-to-digital (A/D) conversion or the like on the electric signal. The audio input part 34 outputs the generated audio data to the controller 37.

The audio output part 35 includes a speaker, converts a digital audio signal input from the controller 37 into an analog audio signal by digital-to-analog (D/A) conversion, and causes the speaker to output an audio corresponding to the analog audio signal.

The storage part 36 is a storage device that stores various types of information. For example, the storage part 36 is a semiconductor memory capable of rewriting data such as a random access memory (RAM), a flash memory, and a non-volatile static random access memory (NVSRAM). The storage part 36 may be a storage apparatus such as a hard disk, a solid state drive (SSD), or an optical disc.

The storage part 36 stores various programs, including control programs executed by the controller 37 and programs for an image restriction process, which will be described below. Further, the storage part 36 stores various types of data used in the program executed by the controller 37.

The controller 37 is a device that controls the operator terminal 12. As the controller 37, an electronic circuit such as a central processing unit (CPU), a micro processing unit (MPU), a graphics processing part (GPU), or an integrated circuit such as an application specific integrated circuit (ASIC), a field programmable gate array (FPGA), or the like may be adopted. The controller 37 includes an internal memory for storing programs or control data defining various process procedures, and executes various processes by these internal memories.

The controller 37 functions as various processors by operating the various programs. For example, the controller 37 includes an capturing controller 37a, an operation reception part 37b, an image acquisition part 37c, an capturing position acquisition part 37d, a shape acquisition part 37e, a position specifying part 37f, a region specifying part 37g, a masking processor 37h, and an output part 37i. Some or all of functions of the various processors may be standard functions of the operator terminal 12, or may be additional functions added to the standard functions.

The capturing controller 37a controls the capturing part 32 to capture an image. For example, the capturing controller 37a causes the capturing part 32 to capture an image at a given frame rate. For example, the capturing controller 37a causes the capturing part 32 to capture a video.

The operation reception part 37b accepts various operations. For example, the operation reception part 37b accepts an operation with a hand or an audio. For example, the operation reception part 37b displays an operation menu or an operation button on the display part 31 according to a given operation. The operation reception part 37b recognizes a hand from an image of image data obtained by the capturing part 32, and accepts various operations such as selections on the operation menu and the operation button with hand tracking. For example, after selecting an operation button for designating a position, the operation reception part 37b accepts designation of the position in a space by recognizing the position pointed by a finger of a hand. Further, for example, the operation reception part 37b accepts an instruction to transmit an image or stop transmitting the image by selecting an operation button for instructing transmission or stop transmitting the image. Further, the operation reception part 37b accepts various operations by using an audio, with audio recognition of audio data.

The image acquisition part 37c acquires image data obtained by capturing the space in which a monitoring target object is disposed. For example, the operator wears the operator terminal 12, and rotates around the monitoring target object while capturing a video by the capturing part 32. The image acquisition part 37c acquires image data (video data) obtained by capturing the monitoring target object from the surroundings by the capturing part 32.

The capturing position acquisition part 37d acquires capturing position data indicating a capturing position of the capturing part 32 in the space when the monitoring target object is captured. For example, the capturing position acquisition part 37d specifies a surrounding shape from the image data obtained by the capturing part 32 and information obtained by the sensor part 33, and acquires spatial information indicating a shape of the space in which the monitoring target object is disposed by performing spatial mapping. For example, the capturing position acquisition part 37d specifies a surrounding shape from data of a 3D camera obtained by the capturing part 32, and acquires spatial information indicating the shape of the space by connecting the specified surrounding shape. The capturing position acquisition part 37d specifies a position in the space of spatially mapped spatial information from the specified surrounding shape, and acquires capturing position data by using the specified position as a capturing position of the capturing part 32.

The shape acquisition part 37e acquires shape information indicating a three-dimensional shape of the monitoring target object. For example, the operator designates a range for acquiring the shape information. For example, the range is designated to surround the monitoring target object. The shape acquisition part 37e recognizes an object (monitoring target object) by performing spatial mapping within the designated range, from the image data obtained by capturing the surroundings of the monitoring target object. The shape acquisition part 37e disposes voxels in conformity to a shape of the recognized object, and acquires shape information indicating the three-dimensional shape of the monitoring target object by the voxels. The specified three-dimensional shape of the monitoring target object may be modifiable by the shape acquisition part 37e in response to a modification instruction. For example, the shape acquisition part 37e displays the voxels disposed in conformity to the recognized shape of the object on the display part 31, thereby displaying the recognized shape of the object. The operation reception part 37b accepts an instruction to modify a displayed voxel, with a hand or an audio. The shape acquisition part 37e performs modification to add or delete a voxel according to the modification instruction accepted by the operation reception part 37b, and acquires shape information indicating the three-dimensional shape of the monitoring target object by the modified voxel.

The shape information acquired by the shape acquisition part 37e may be stored in the server apparatus 11. The shape information may be added with additional information such as a name, an identification ID of the monitoring target object, and a disposition space. The operation reception part 37b accepts an instruction to store the shape information by adding the additional information such as the name, the identification ID of the monitoring target object, or the disposition space, with a hand or an audio. When the operation reception part 37b instructs to store the shape information, the shape acquisition part 37e transmits the shape information to which the additional information is added to the server apparatus 11. The server apparatus 11 associates an account of the operator terminal 12 with the received shape information, and stores the information as the shape information 21a in the storage part 21.

The shape information 21a stored in the server apparatus 11 may be read from the operator terminal 12. The server apparatus 11 notifies the operator terminal 12 of the additional information on the shape information 21a stored in the storage part 21 in association with the account of the operator terminal 12. The operation reception part 37b displays the name of the shape information and the additional information of the disposition space, and accepts an instruction to read the shape information. When the operation reception part 37b instructs to read the shape information, the shape acquisition part 37e acquires the shape information 21a instructed to be read from the server apparatus 11.

In this manner, when performing the spatial mapping, acquiring the shape information of the monitoring target object, and storing the shape information in the server apparatus 11 once, the operator terminal 12 can use the stored shape information.

The position specifying part 37f specifies a disposition position of the monitoring target object in the space in which the monitoring target object is disposed. For example, in the space in which the monitoring target object is disposed, a reference point that is a reference position is determined. The reference point may be designated as a mark on the floor or the like of the space. Further, the operation reception part 37b may accept designation of the reference point to be set as the reference position in the space, with a hand or an audio. In a case where the shape acquisition part 37e performs the spatial mapping to recognize the monitoring target object and acquire shape information, the position specifying part 37f specifies a disposition position of the monitoring target object in the space of spatial information, by using the reference point as a reference. On the other hand, in a case where the shape information is acquired from the server apparatus 11, the operator terminal 12 performs alignment of a shape of the monitoring target object indicated by the shape information with respect to the space of the spatial information, by the operator. The operator terminal 12 displays the shape of the monitoring target object indicated by the shape information on the display part 31, and the operation reception part 37b accepts an alignment operation, with a hand or an audio. The position specifying part 37f specifies a disposition position of the monitoring target object in the space of the aligned spatial information, by using the reference point as a reference.

The region specifying part 37g specifies a region of the monitoring target object in the image of the image data acquired by the image acquisition part 37c. For example, the region specifying part 37g specifies the shape of the monitoring target object disposed at the disposition position with a capturing position indicated by the capturing position data as a viewpoint position, based on the capturing position data acquired by the capturing position acquisition part 37d, the shape information acquired by the shape acquisition part 37e, and the disposition position of the monitoring target object specified by the position specifying part 37f For example, the region specifying part 37g disposes voxels indicating the three-dimensional shape of the monitoring target object based on the shape information, at a position which is a disposition position of the monitoring target object in the space of the spatially mapped spatial information. The region specifying part 37g specifies, in the space of the spatial information, a shape obtained when the voxel is viewed from a position which is the capturing position indicated by the capturing position data. The region specifying part 37g specifies a region of the monitoring target object in the image of the image data, based on the specified shape. For example, the region specifying part 37g specifies a region of the specified shape as the region of the monitoring target object, in the image of the image data. Alternatively, the region specifying part 37g specifies an orientation direction (front direction) of a face from the image data obtained by the capturing part 32 and the information obtained by the sensor part 33, and specifies a region of the specified shape corresponding to the orientation direction (front direction) of the face of the image of the image data, as the region of the monitoring target object. The region specifying part 37g may display an image of the voxels on the display part 31, corresponding to the voxels disposed in the space of the spatial information.

The masking processor 37h performs a masking process on a region other than the region of the monitoring target object specified by the region specifying part 37g, of the image of the image data acquired by the image acquisition part 37c. For example, the masking processor 37h generates first image data by performing the masking process in which the region other than the region of the monitoring target object of the image of the image data acquired by the image acquisition part 37c is set to be in an opaque state. Further, the masking processor 37h generates second image data by performing the masking process in which the region other than the region of the monitoring target object in the image of the image data acquired by the image acquisition part 37c is set to be in a translucent state.

The output part 37i outputs image data masking-processed by the masking processor 37h. For example, the output part 37i causes the operation reception part 37b to output the image data masking-processed by the masking processor 37h. For example, the output part 37i outputs the first image data masking-processed by the masking processor 37h to the terminal apparatus 13 of the instructor via the server apparatus 11. Further, the output part 37i outputs the second image data to the display part 31.

Specific Example

Figure 4:
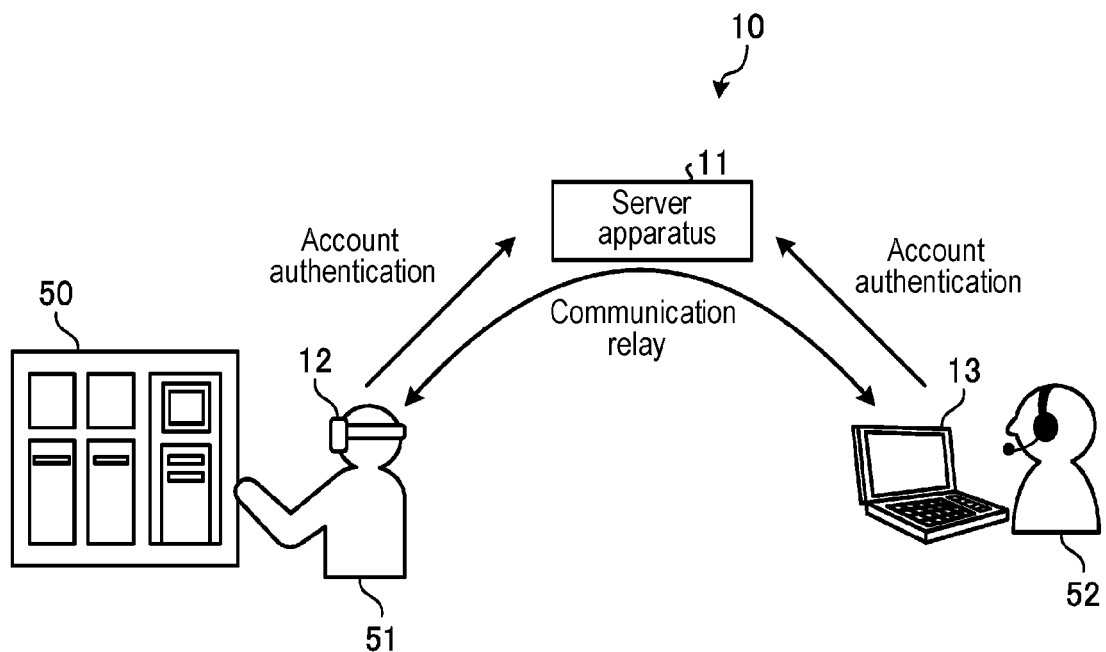
FIG. 4 is a diagram describing a remote support of an operation by the support system according to the first embodiment.

Next, a specific example will be described in which the support system 10 according to the first embodiment is used to remotely support an operation performed on a monitoring target object. Hereinafter, a case will be described in which a substrate processing apparatus 50 is set as the monitoring target object, and the operation such as maintenance of the substrate processing apparatus 50 is remotely supported. FIG. 4 is a diagram for explaining the remote support for the operation by the support system 10 according to the first embodiment.

An operator 51 wears a head-mounted display, which is the operator terminal 12, on his/her head. The operator 51 operates the operator terminal 12 to access the server apparatus 11 to authenticate an account.

The instructor 52 who supports maintenance accesses the server apparatus 11 by operating the terminal apparatus 13 to authenticate an account.

The operator 51 designates an account for permitting communication from the operator terminal 12. For example, the operator 51 designates the account of the instructor 52 as the account for permitting communication. In this manner, the server apparatus 11 relays communication between the operator terminal 12 and the terminal apparatus 13. In this manner, for example, the instructor 52 may communicate with the operator 51 wearing the operator terminal 12 by connecting a microphone, a speaker, or a headset to the terminal apparatus 13.

In a case of restricting an image to be transmitted to the terminal apparatus 13 such that a region other than a region of the substrate processing apparatus 50 is concealed in the image, for example, the operator 51 performs the following preparatory operation. The preparatory operation may be performed at any time before receiving support remotely.

The operator 51 moves around the substrate processing apparatus 50 in a state in which the operator terminal 12 is mounted on his/her head. The operator terminal 12 performs capturing by the capturing part 32. For example, the capturing controller 37a causes the capturing part 32 to capture an image at a given frame rate. The image acquisition part 37c acquires image data captured by the capturing part 32.

The operator terminal 12 acquires capturing position data indicating an capturing position at which the substrate processing apparatus 50 is captured by the capturing part 32, in a space in which the substrate processing apparatus 50 is disposed. For example, the capturing position acquisition part 37d specifies a surrounding shape from the image data obtained by the capturing part 32 and information obtained by the sensor part 33, and performs the spatial mapping to acquire spatial information indicating a shape of the space in which the substrate processing apparatus 50 is disposed. The capturing position acquisition part 37d specifies a position in the space of spatially mapped spatial information from the specified surrounding shape, and acquires capturing position data by using the specified position as a capturing position of the capturing part 32.

Figure 5:
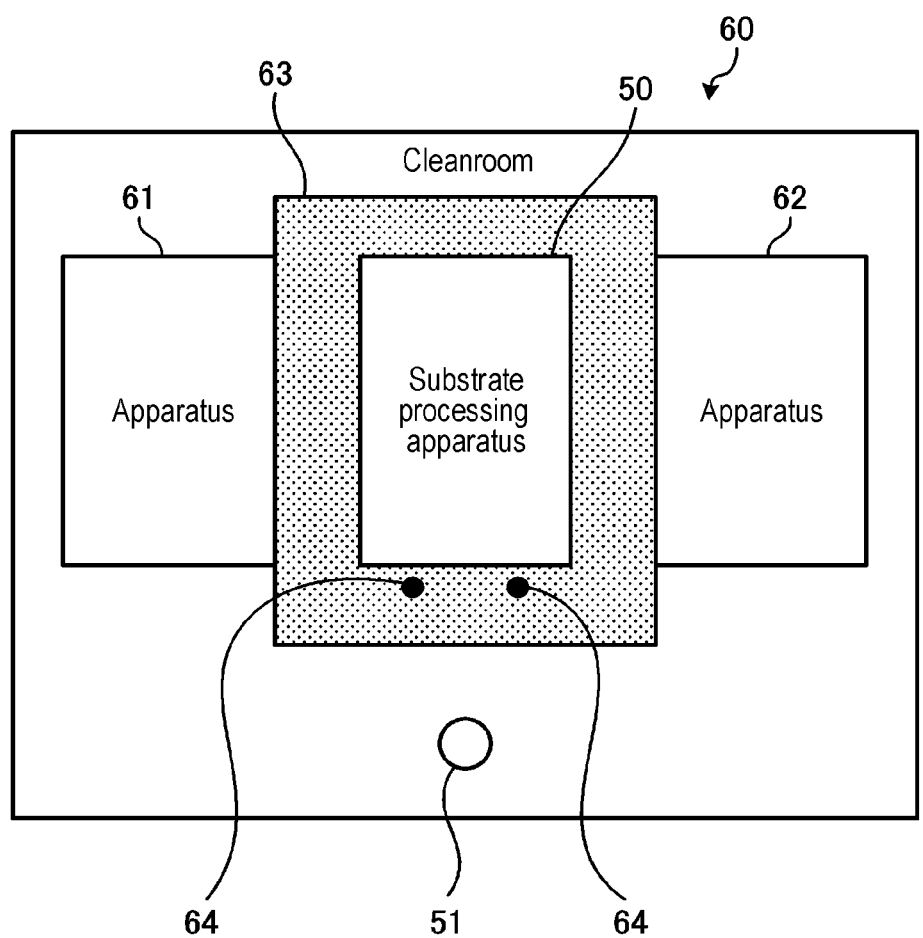
FIG. 5 is a diagram schematically illustrating a space in which a substrate processing apparatus is disposed according to the first embodiment.

The operator terminal 12 acquires shape information indicating a three-dimensional shape of the substrate processing apparatus 50. FIG. 5 is a diagram schematically illustrating a space in which the substrate processing apparatus 50 is disposed according to the first embodiment. In FIG. 5, the substrate processing apparatus 50, which is a maintenance target, is disposed in a cleanroom 60, and apparatuses 61 and 62 such as different substrate processing apparatuses are disposed at both sides of the substrate processing apparatus 50. For example, since there are various types of confidential information inside the cleanroom 60, it is desired to conceal the others except for the substrate processing apparatus 50 from the instructor 52. For example, it is not desired to show the apparatuses 61 and 62 to the instructor 52. In such a case, the operator 51 designates a range 63 to surround the substrate processing apparatus 50. Further, the operator 51 designates reference points 64. For example, the operator 51 designates the two reference points 64 at given intervals.

Figure 6:
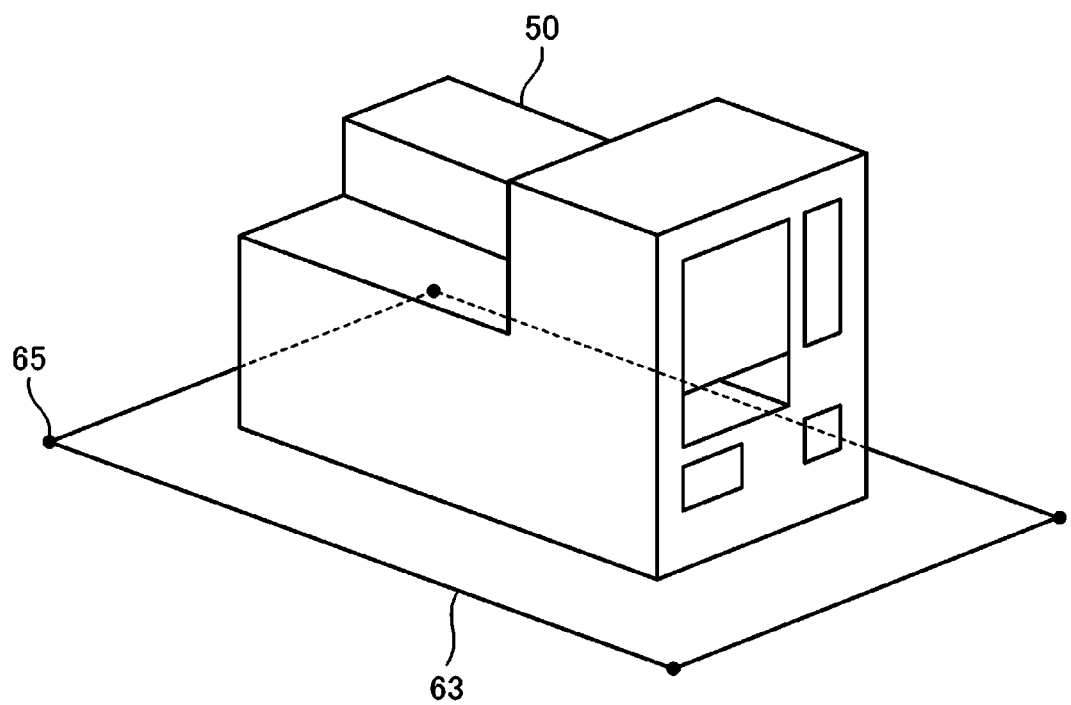
FIG. 6 is a diagram illustrating a flow of acquiring shape information according to the first embodiment.
Figure 7:
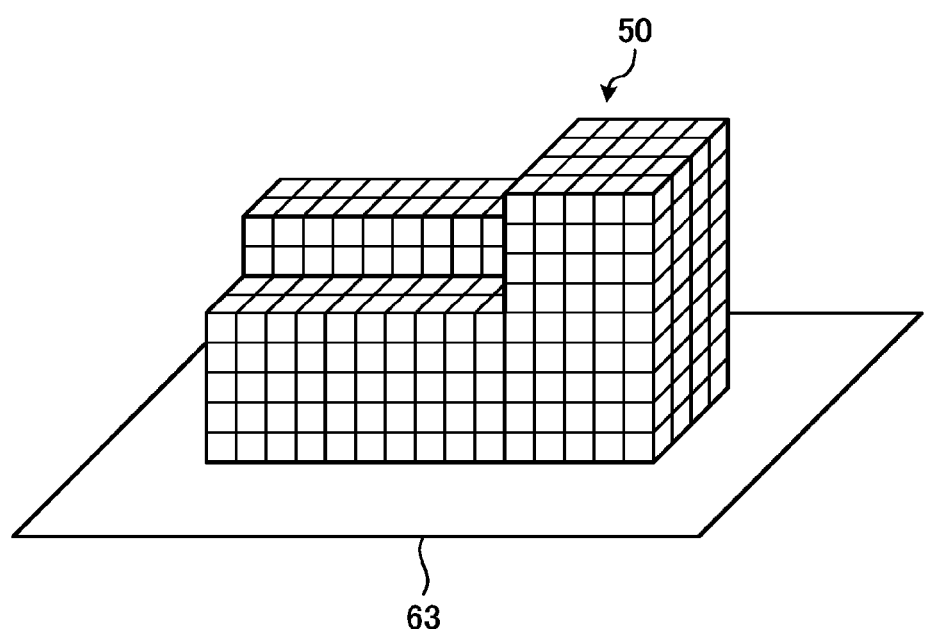
FIG. 7 is a diagram illustrating the flow of acquiring the shape information according to the first embodiment.

The operator terminal 12 acquires shape information indicating a three-dimensional shape of the substrate processing apparatus 50. For example, the shape acquisition part 37e recognizes an object (the substrate processing apparatus 50) by performing the spatial mapping within the designated range 63, disposes voxels in conformity to a shape of the recognized object, and acquires shape information indicating a three-dimensional shape of the substrate processing apparatus 50 by using the voxels. FIGS. 6 and 7 are diagrams illustrating a flow of acquiring shape information according to the first embodiment. In FIG. 6, the range 63 is designated by four points 65 to surround the substrate processing apparatus 50. The range 63 may be designated in any manner. For example, in a case where the operator terminal 12 designates the range 63 by sequentially designating positions of the points 65, the range 63 is designated such that the designated positions of the point 65 are connected with a line, and the first designated position of the point 65 and the last designated position of the point 65 are further connected with a line. FIG. 7 illustrates a state in which the substrate processing apparatus 50 within the range 63 is recognized and voxels are disposed in conformity to a shape of the substrate processing apparatus 50. As illustrated in FIG. 7, the shape acquisition part 37e disposes the voxels in conformity to the shape of the substrate processing apparatus 50, and acquires shape information indicating the three-dimensional shape of the substrate processing apparatus 50 by using the voxels. The operator terminal 12 stores the acquired shape information.

Next, a description will be given with respect to a flow of receiving remote support for operations on the substrate processing apparatus 50, while restricting an image such that an object other than the substrate processing apparatus 50 is not captured.

The operator terminal 12 may perform an operation of transmitting an image or stopping transmission of the image captured by the capturing part 32. For example, the operation reception part 37b accepts an image transmission instruction, with a hand or an audio. When accepting the image transmission instruction, the operator terminal 12 causes the capturing part 32 to perform capturing. For example, the capturing controller 37a causes the capturing part 32 to capture an image at a given frame rate. The image acquisition part 37c acquires image data captured by the capturing part 32.

The operator terminal 12 acquires, in the cleanroom 60, capturing position data indicating a capturing position at which the substrate processing apparatus 50 is captured by the capturing part 32. For example, the capturing position acquisition part 37d specifies a surrounding shape from the image data obtained by the capturing part 32 and information obtained by the sensor part 33, and performs the spatial mapping to acquire spatial information indicating a shape of the cleanroom 60. The capturing position acquisition part 37d specifies a position in the space (cleanroom 60) of the spatially mapped spatial information from the specified surrounding shape, and acquires capturing position data by using the specified position as the capturing position of the capturing part 32.

The operator terminal 12 specifies a disposition position of the substrate processing apparatus 50 in the cleanroom 60. For example, the position specifying part 37f specifies the disposition position of the substrate processing apparatus 50 in a space of the spatial information, by using the reference point 64 as a reference.

The operator terminal 12 specifies a region of the substrate processing apparatus 50 in the image of the image data captured by the capturing part 32. For example, the region specifying part 37g specifies the shape of the substrate processing apparatus 50 disposed at the disposition position at which the capturing position indicated by the capturing position data is set as a viewpoint position, based on the capturing position data, the shape information, and the specified disposition position of the substrate processing apparatus 50. For example, the region specifying part 37g disposes voxels representing the three-dimensional shape of the substrate processing apparatus 50 based on the shape information, at positions which are the disposition position of the substrate processing apparatus 50 in the space (the cleanroom 60) of the spatial information. The region specifying part 37g specifies, in the space of the spatial information, a shape obtained when the voxel is viewed from a position which is the capturing position indicated by the capturing position data. The region specifying part 37g specifies the region of the substrate processing apparatus 50 in the image of the image data, based on the specified shape.

The operator terminal 12 performs a masking process on a region other than the region of the substrate processing apparatus 50 in the image of the image data captured by the capturing part 32. For example, the masking processor 37h generates first image data by performing the masking process in which the region other than the region of the substrate processing apparatus 50 of the image of the image data acquired by the image acquisition part 37c is set to be in an opaque state. For example, the masking processor 37h generates second image data by performing the masking process in which the region other than the region of the substrate processing apparatus 50 of the image of the image data acquired by the image acquisition part 37c is set to be in a translucent state.

The operator terminal 12 outputs the masking-processed image data. For example, the output part 37i outputs the first image data masking-processed by the masking processor 37h to the terminal apparatus 13 of the instructor via the server apparatus 11. Further, the output part 37i outputs the second image data to the display part 31.

Figure 8:
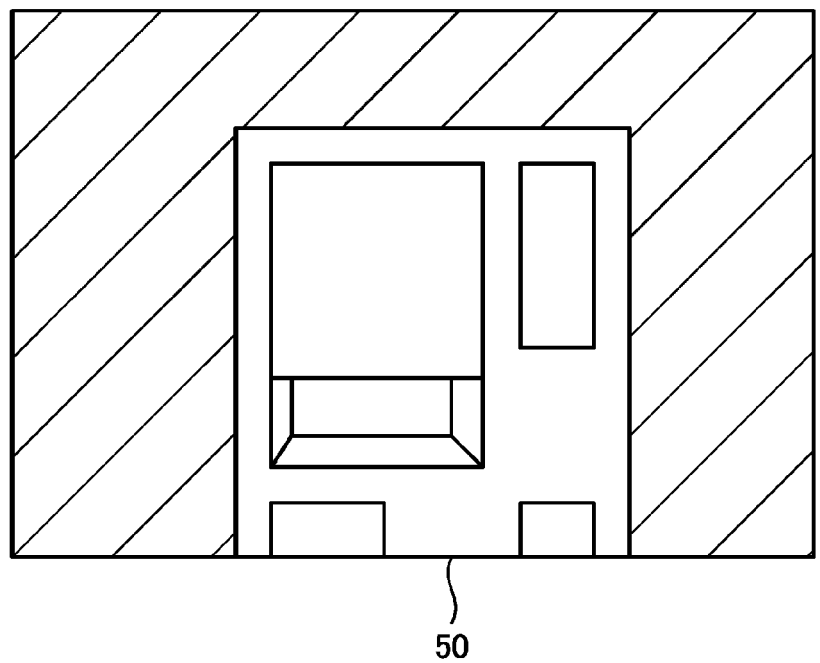
FIG. 8 is a diagram illustrating an example of an image of first image data according to the first embodiment.

The terminal apparatus 13 displays an image received from the operator terminal 12 via the server apparatus 11. For example, the terminal apparatus 13 displays an image of the first image data. The instructor 52 sees the image displayed on the terminal apparatus 13, and remotely supports operations. FIG. 8 is a diagram illustrating an example of an image of first image data according to the first embodiment. As illustrated in FIG. 8, in the image in the first image data, a region other than a region of the substrate processing apparatus 50 is in an opaque state. In this manner, the region other than the region of the substrate processing apparatus 50 may be concealed. For example, surrounding apparatuses such as the apparatuses 61 and 62 may be concealed. In addition, the image of the first image data includes the substrate processing apparatus 50. In this manner, since the instructor 52 may visually recognize the substrate processing apparatus 50 from the image of the first image data, the instructor 52 may smoothly support the operation performed on the substrate processing apparatus 50.

Figure 9:
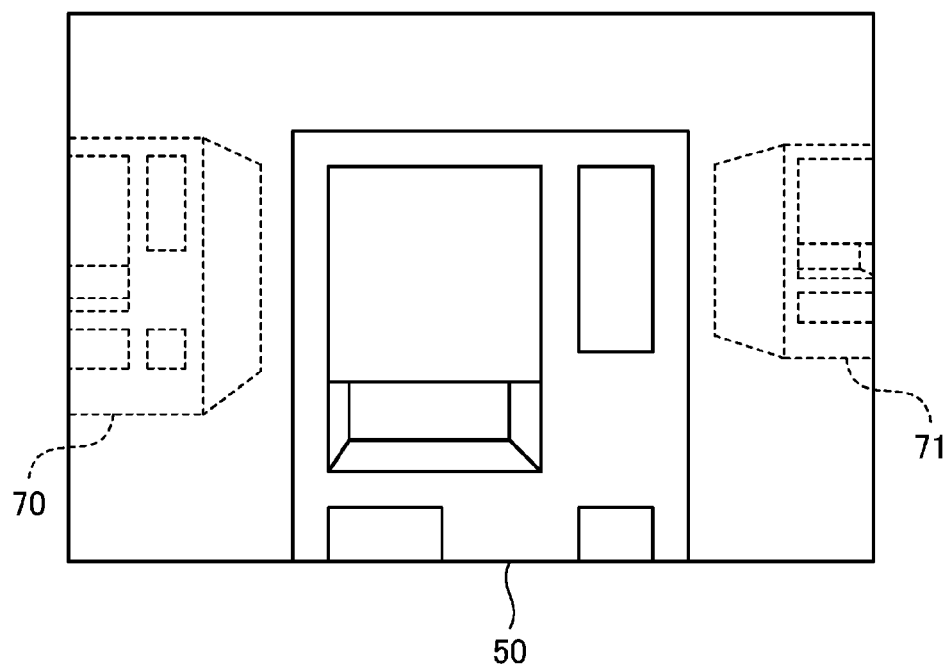
FIG. 9 is a diagram illustrating an example of an image of second image data according to the first embodiment.

The operator terminal 12 displays an image of the second image data on the display part 31. FIG. 9 is a diagram illustrating an example of an image of second image data according to the first embodiment. As illustrated in FIG. 9, in the image of the second image data, a region other than the region of the substrate processing apparatus 50 is in a translucent state, and surrounding apparatuses 70 and 71 may be viewed in the translucent state. Since the substrate processing apparatus 50 is also viewed via the display part 31, the operator 51 may secure a necessary visual field with respect to the substrate processing apparatus 50, and safely perform the operation. Further, since the region other than the region of the substrate processing apparatus 50 is also viewed in a translucent state via the display part 31, the operator 51 may grasp the surroundings. For example, the operator 51 may grasp the presence of the apparatuses 70 and 71 via the display part 31.

The case where the operator terminal 12 displays the image of the second image data on the display part 31 is described as an example, but the present embodiment is not limited thereto. For example, the operator terminal 12 may set the display part 31 in a transparent state to allow the operator 51 to see the surroundings via the display part 31, without displaying the image of the second image data on the display part 31. Further, the operator terminal 12 may switch and display the image of the first image data on the display part 31, according to an operation by a hand or an audio. In this manner, the operator 51 may confirm the image of the first image data displayed on the terminal apparatus 13 of the instructor 52, and may confirm whether the region other than the region of the substrate processing apparatus 50 is in an opaque state and the region other than the region of the substrate processing apparatus 50 of the image is concealed.

Here, the operator terminal 12 according to the present embodiment specifies a shape of the substrate processing apparatus 50 disposed at a disposition position at which a capturing position is a viewpoint position, and specifies a region of the substrate processing apparatus 50 in the image of the image data, based on the specified shape. The operator terminal 12 performs the masking process on the region other than the region of the substrate processing apparatus 50 of the image of the image data. Therefore, for example, even in a case where the operator 51 moves in the cleanroom 60 and the shape, a size, or a captured surface of the substrate processing apparatus 50 is changed in the image of the image data captured by the capturing part 32, the masking process may be performed on the region other than the region of the substrate processing apparatus 50. In this manner, even if the shape, the size, or the captured surface of the substrate processing apparatus 50 is changed in the image, the image may be restricted such that the region other than the region of the substrate processing apparatus 50 is concealed.

In addition, the support system 10 of the present embodiment generates first image data by performing the masking process in which the region other than the region of the substrate processing apparatus 50 is in the opaque state in the operator terminal 12, and outputs the first image data to the terminal apparatus 13 of the instructor via the server apparatus 11. In this manner, the first image data is transmitted to the network N. The first image data is obtained by performing the masking process in which the region other than the region of the substrate processing apparatus 50 is set to be in the opaque state. In this manner, even in a case where the network N is sniffed and the first image data is illegally read, for example, the region other than the region of the substrate processing apparatus 50 in the image may be concealed.

[Processing Flow]

Figure 10:
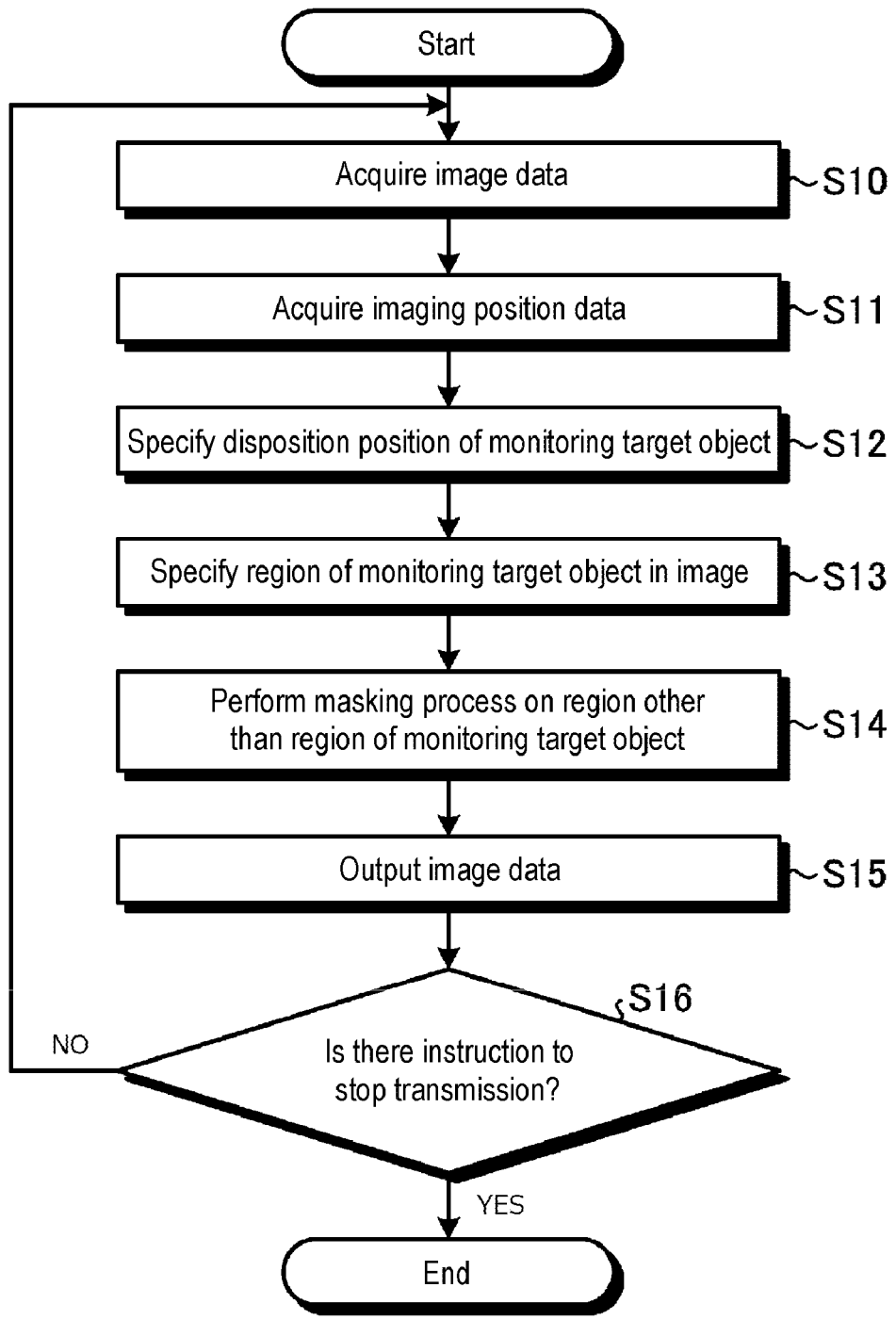
FIG. 10 is a flowchart illustrating a procedure of an image restriction process according to the first embodiment.

Next, a procedure of an image restriction process executed by the operator terminal 12 according to the first embodiment will be described. FIG. 10 is a flowchart illustrating a procedure of the image restriction process according to the first embodiment. The flowchart of FIG. 10 illustrates a flow of transmitting an image when the operation reception part 37b instructs the transmission of the image.

The image acquisition part 37c acquires image data obtained by capturing a space in which a monitoring target object is disposed (step S10). For example, the capturing controller 37a causes the capturing part 32 to capture an image at a given frame rate. The image acquisition part 37c acquires image data captured by the capturing part 32.

The capturing position acquisition part 37d acquires capturing position data indicating a capturing position at which the monitoring target object is captured by the capturing part 32 in the space in which the monitoring target object is disposed (step S11). For example, the capturing position acquisition part 37d specifies a surrounding shape from the image data obtained by the capturing part 32 and information obtained by the sensor part 33, and acquires spatial information indicating a shape of the space in which the monitoring target object is disposed by performing the spatial mapping. The capturing position acquisition part 37d specifies a position in the space of spatially mapped spatial information from the specified surrounding shape, and acquires capturing position data by using the specified position as a capturing position of the capturing part 32.

The position specifying part 37f specifies a disposition position of the monitoring target object in the space in which the monitoring target object is disposed (step S12). For example, the position specifying part 37f specifies the disposition position of the monitoring target object in a space of the spatial information, by using the reference point 64 as a reference.

The region specifying part 37g specifies a region of the monitoring target object in an image of the image data acquired by the image acquisition part 37c (step S13). For example, the region specifying part 37g disposes voxels indicating the three-dimensional shape of the monitoring target object based on the shape information, at a position which is a disposition position of the monitoring target object in the space of the spatially mapped spatial information. The region specifying part 37g specifies, in the space of the spatial information, a shape obtained when the voxel is viewed from a position which is the capturing position indicated by the capturing position data.

The masking processor 37h performs a masking process on a region other than the region of the monitoring target object specified by the region specifying part 37g, of the image of the image data acquired by the image acquisition part 37c (step S14). The output part 37i outputs the image data masking-processed by the masking processor 37h (step S15).

The output part 37i determines whether or not an instruction to stop transmitting the image is instructed (step S16). When the transmission stop is not instructed (NO in step S16), the process proceeds to step S10 described above. On the other hand, when the transmission stop is instructed (YES in step S16), the process is ended.

As described above, the operator terminal 12 according to the first embodiment includes the image acquisition part 37c, the capturing position acquisition part 37d, the shape acquisition part 37e, the position specifying part 37f, the region specifying part 37g, the masking processor 37h, and the output part 37i. The image acquisition part 37c acquires image data obtained, by the capturing part 32, capturing a space (the cleanroom 60) in which a monitoring target object (the substrate processing apparatus 50) is disposed. The capturing position acquisition part 37d acquires capturing position data indicating a capturing position of the capturing part 32 in the space when the monitoring target object is captured. The shape acquisition part 37e acquires shape information indicating a three-dimensional shape of the monitoring target object. The position specifying part 37f specifies a disposition position of the monitoring target object in the space. The region specifying part 37g specifies a shape of the monitoring target object disposed at the disposition position with a capturing position indicated by capturing position data as a viewpoint position, based on the capturing position data acquired by the capturing position acquisition part 37d, shape information acquired by the shape acquisition part 37e, and the disposition position of the monitoring target object specified by the position specifying part 37f. Based on a result of the specifying, the region specifying part 37g specifies a region of the monitoring target object in the image of the image data acquired by the image acquisition part 37c. The masking processor 37h performs a masking process on a region other than the region of the monitoring target object specified by the region specifying part 37g, of the image of the image data acquired by the image acquisition part 37c. The output part 37i outputs image data masking-processed by the masking processor 37h. In this manner, the operator terminal 12 may restrict the image such that a region other than the region of the monitoring target object is concealed. Further, the operator terminal 12 generates image data (video data) by performing a masking process while following the movement of the operator, with an MR technique. In the MR technique, a virtual space is used as a basis, and the virtual space and a real space are fused by recognizing the space. The operator terminal 12 generates the image data (video data) by performing the masking process while following the movement of the operator, with the MR technique, so that it is possible to prevent confidential information that may be reflected in the region other than the region of the monitoring target object from being erroneously transmitted to an outside (the terminal apparatus 13 of the instructor 52 who performs the remote instruction). In addition, a viewpoint of the operator is moved with a change in position or the like of the operator during the operation. Meanwhile, by using the MR technique, the operator terminal 12 may easily follow the movement of the viewpoint of the operator and restrict the image.

Further, the shape acquisition part 37e specifies a three-dimensional shape of the monitoring target object from the image data obtained by capturing the surroundings of the monitoring target object, and modifies the specified three-dimensional shape of the monitoring target object according to a modification instruction to acquire shape information. In this manner, the operator terminal 12 may modify the specified three-dimensional shape of the monitoring target object into a correct shape. As a result, the image of the entire monitoring target object may be captured. Further, it is possible to restrict the image with high accuracy so that an object other than the monitoring target object is not captured in the image.

Further, the masking processor 37h generates first image data by performing a masking process in which the region other than the region of the monitoring target object of the image of the image data is set to be in an opaque state, and second image data by performing the masking process in which the region other than the region of the monitoring target object of the image of the image data is set to be in a translucent state. The output part 37i outputs the first image data to the terminal apparatus 13 of the instructor 52 who remotely instructs the operation on the monitoring target object. The output part 37i outputs the second image data to the display part 31 of the head-mounted display worn by the operator 51 performing an operation on the monitoring target object according to an instruction from the instructor. In this manner, it is possible to conceal the region other than the region of the monitoring target object of the image from the instructor 52. Further, since the image may be provided to the operator 51 in a state in which the operator 51 can grasp the surroundings, the operator 51 may perform the operation safely while securing a necessary visual field.

Second Embodiment

Next, a second embodiment will be described. Since the support system 10, the operator terminal 12, and the terminal apparatus 13 according to a second embodiment have the same configurations as those in the first embodiment, descriptions thereof will be omitted, and differences will be mainly described.

Figure 11:
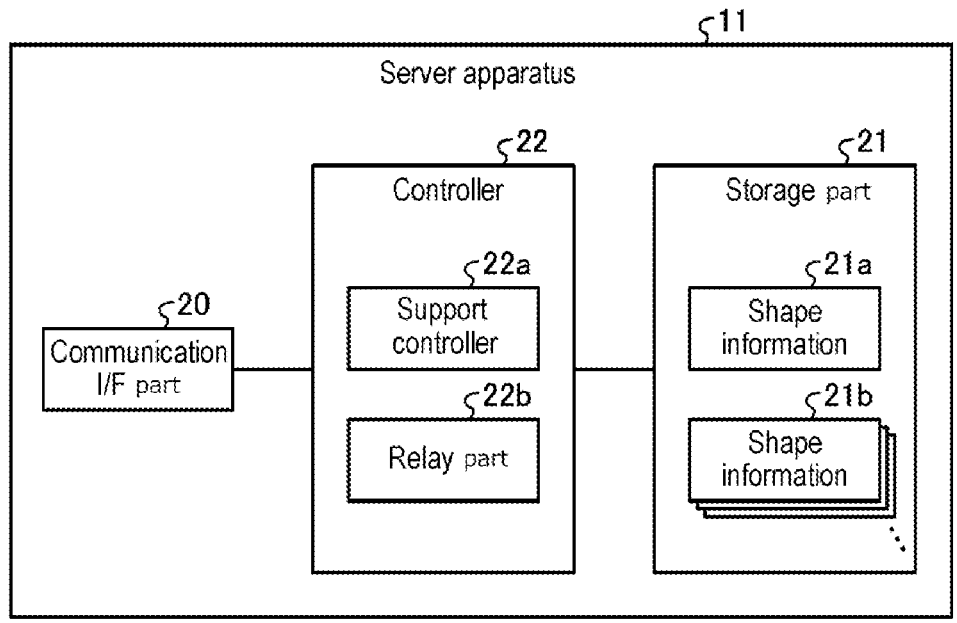
FIG. 11 is a diagram illustrating an example of a functional configuration of a server apparatus according to a second embodiment.

FIG. 11 is a diagram illustrating an example of a functional configuration of the server apparatus 11 according to the second embodiment. Since the server apparatus 11 according to the second embodiment has the partially same configuration with the server apparatus 11 according to the first embodiment illustrated in FIG. 2, same portions will be denoted by the same reference numerals, and descriptions thereof will be mainly omitted, and different portions will be described.

The storage part 21 further stores shape information 21b. The shape information 21b is data indicating a three-dimensional shape of a monitoring target object for each type of the monitoring target object. The storage part 21 stores the shape information 21b of a type of monitoring target object in association with the type, for each type of monitoring target object. For example, in a case where the monitoring target object is the substrate processing apparatus 50, the shape information 21b is data indicating a three-dimensional shape of the substrate processing apparatus 50. The storage part 21 stores the shape information 21b of the type of substrate processing apparatus 50 associated with the type, for each type such as a model number of the substrate processing apparatus 50.

Each shape information 21b stored in the storage part 21 of the server apparatus 11 may be read from the operator terminal 12. The operator terminal 12 acquires shape information according to the type of the monitoring target object from the storage part 21 of the server apparatus 11. For example, the server apparatus 11 notifies the operator terminal 12 of information on the type of the substrate processing apparatus 50 such as a model number associated with each shape information 21b. The operation reception part 37b displays the information on the type, and accepts an instruction to read the shape information 21b. The operator 51 designates a type, and instructs to read the shape information 21b. When the operation reception part 37b instructs reading, the shape acquisition part 37e acquires the shape information 21b of the type for which the reading is instructed, from the storage part 21 of the server apparatus 11.

The shape acquisition part 37e may identify the type of the monitoring target object from an image of image data captured by the capturing part 32, and acquire the shape information 21b of the identified type from the storage part 21 of the server apparatus 11. For example, in a case where identification information such as a number, a text, a mark, and a code image indicating the type of the substrate processing apparatus 50 such as a model number is attached to the substrate processing apparatus 50, the shape acquisition part 37e identifies the type of the substrate processing apparatus 50 from the identification information included in the image of the image data captured by the capturing part 32. The shape acquisition part 37e may acquire the identified type of shape information 21b from the storage part 21 of the server apparatus 11.

In this manner, the operator terminal 12 may acquire the shape information 21b corresponding to the shape of the monitoring target object, without performing spatial mapping, by acquiring the shape information 21b from the storage part 21 of the server apparatus 11. In the operator terminal 12, the operator aligns the shape of the monitoring target object represented by the shape information 21b with respect to a space of spatial information. In this manner, the position specifying part 37f may specify a disposition position of the monitoring target object in the space of the aligned spatial information, by using a reference point as a reference.

As described above, the server apparatus 11 according to the second embodiment stores the shape information 21b indicating the three-dimensional shape of the monitoring target object for each type of the monitoring target object in the storage part 21. In the operator terminal 12, the shape acquisition part 37e acquires the shape information 21b according to the type of the monitoring target object captured by the capturing part 32, from the storage part 21 of the server apparatus 11. In this manner, the operator terminal 12 may acquire the shape information 21b corresponding to the shape of the monitoring target object, without acquiring shape information from the monitoring target object.

The shape information 21b acquired from the storage part 21 of the server apparatus 11 may be modified. For example, the shape acquisition part 37e disposes voxels in conformity to the shape of the monitoring target object indicated by the shape information 21b, and displays the disposed voxels on the display part 31. The operation reception part 37b accepts an instruction to modify a displayed voxel, with a hand or an audio. The shape acquisition part 37e may perform modification to add or delete a voxel according to the modification instruction accepted by the operation reception part 37b, and modify the shape information 21b according to the modification.

Third Embodiment

Next, a third embodiment will be described. Since the support system 10, the server apparatus 11, the operator terminal 12, and the terminal apparatus 13 according to the third embodiment have the same configurations as those in the first or second embodiment, descriptions thereof will be omitted, and differences will be mainly described.

The operator terminal 12 further accepts designation of a range in which a monitoring target object is to be displayed. For example, the operation reception part 37b accepts designation of the range in which the monitoring target object is to be displayed through an operation using a hand or an audio.

The masking processor 37h performs a masking process on a region other than a region of the monitoring target object specified by the region specifying part 37g and a region other than the range accepted by the operation reception part 37b, in an image of image data acquired by the image acquisition part 37c. For example, the masking processor 37h generates first image data by performing the masking process in which the region other than the region of the monitoring target object in the image of the image data acquired by the image acquisition part 37c and the region other than the range accepted by the operation reception part 37b are set to be an opaque state. Further, the masking processor 37h generates second image data by performing the masking process in which the region other than the region of the monitoring target object in the image of the image data acquired by the image acquisition part 37c is set to be in a translucent state.

Figure 12:
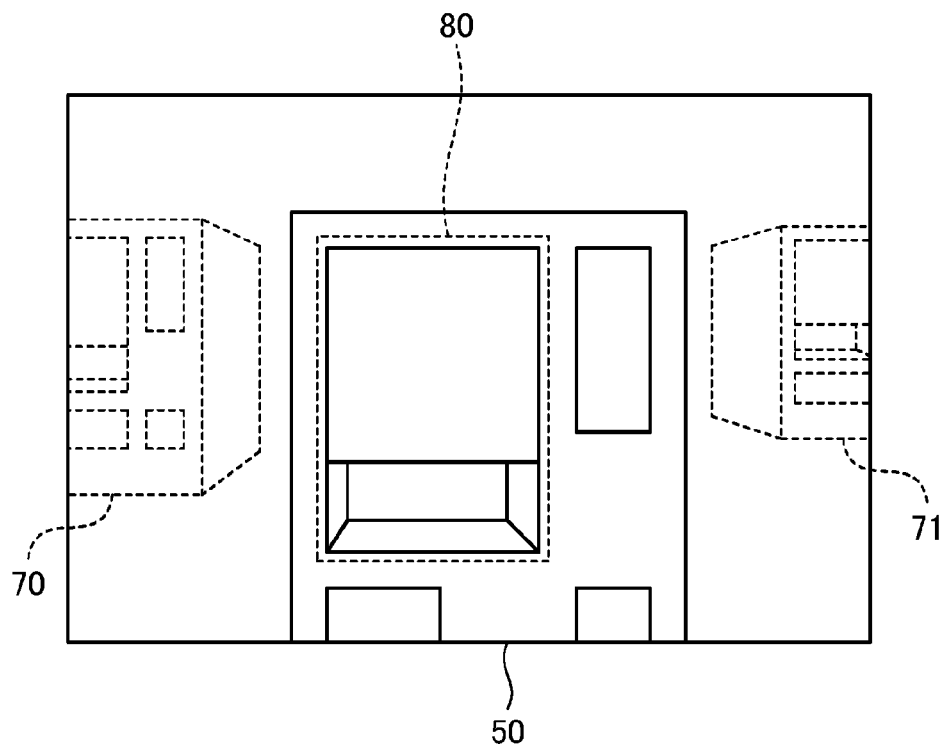
FIG. 12 is an example of an image displayed on a display part of an operator terminal according to a third embodiment.

A specific example will be described. FIG. 12 is an example of an image displayed on the display part 31 of the operator terminal 12 according to the third embodiment.

FIG. 12 is an image of second image data, and the substrate processing apparatus 50 and the surroundings are viewed. An operator designates a range in which the substrate processing apparatus 50 is to be displayed, with an operation using a hand or by an audio. In FIG. 12, a range 80 in which the substrate processing apparatus 50 is to be displayed is designated.

Figure 13:
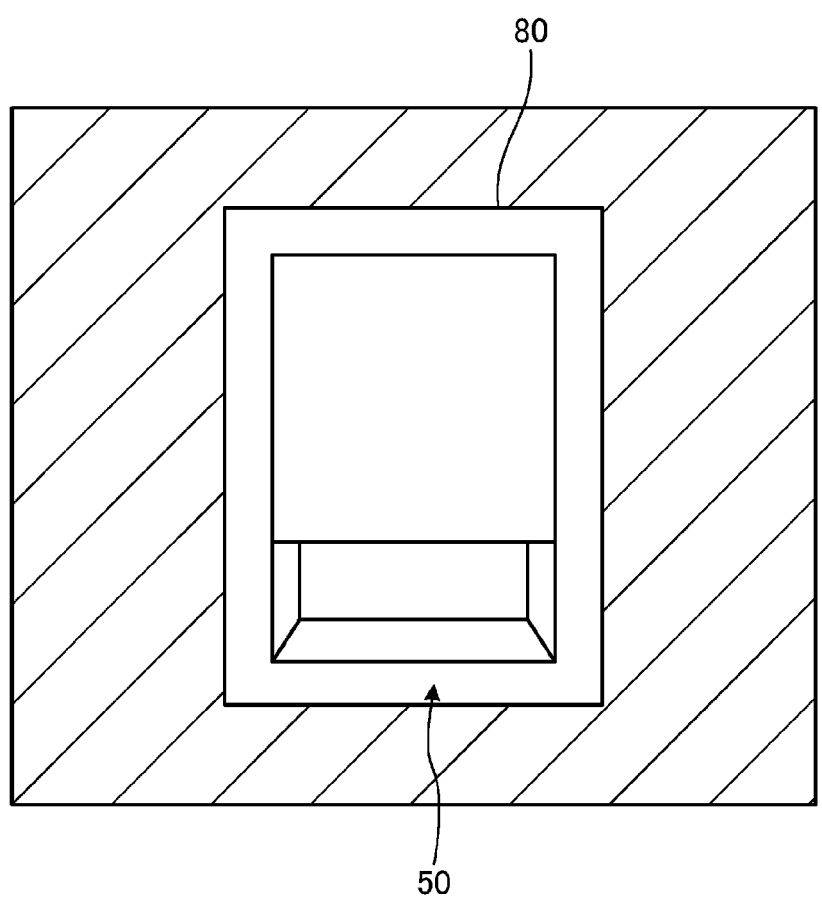
FIG. 13 is a diagram illustrating an example of an image of first image data according to the third embodiment.

The operator terminal 12 generates first image data by performing a masking process in which a region other than a region of the substrate processing apparatus 50 included in an image of image data captured by the capturing part 32 and a region other than the range 80 are set to be in an opaque state. The first image data is transmitted to the terminal apparatus 13 of an instructor via the server apparatus 11, and displayed on the terminal apparatus 13. FIG. 13 is a diagram illustrating an example of an image of first image data according to the third embodiment. As illustrated in FIG. 13, in the image in the first image data, the region other than the region within the range 80 of the substrate processing apparatus 50 is set to be in an opaque state. In this manner, the image is restricted such that an unnecessary portion or a target to be concealed is not leaked outside the cleanroom, for example, via the server apparatus 11 during an operation such as maintenance.

As described above, in the operator terminal 12 according to the third embodiment, the operation reception part 37b (reception part) accepts designation of the range in which the monitoring target object is to be displayed. The masking processor 37h performs the masking process on a region other than the range accepted by the operation reception part 37b, in the image of the image data acquired by the image acquisition part 37c. In this manner, the operator terminal 12 may restrict the image not to include an unnecessary image region of the monitoring target object.

Although the embodiments has been described above, the embodiments disclosed herein is illustrative and should not be construed as limiting in all aspects. The embodiments described above may be embodied in various forms. The embodiments described above may be omitted, replaced, or modified in various forms without departing from the scope and spirit of the claims.

For example, in the above-described embodiments, as an example, the case where the operator terminal 12 is configured as a head-mounted display that can be worn on the head of the operator is described. However, the present embodiment is not limited thereto. The operator terminal 12 may be configured to be divided into a plurality of housings. For example, the operator terminal 12 may be configured with a head-mounted apparatus that is to be worn on the head of the operator, and an information processing apparatus capable of communicating with the head-mounted apparatus in a wired or wireless manner. The head-mounted apparatus is provided with the display part 31, the capturing part 32, the sensor part 33, the audio input part 34, the audio output part 35, and the like. The information processing apparatus is provided with the communication I/F part 30, the storage part 36, and the controller 37, and may perform the process of each embodiment, based on various types of information such as image data obtained from the head-mounted portion. In this case, the information processing apparatus corresponds to the information processing apparatus of the present disclosure. Further, the process of each embodiment may be executed by the server apparatus 11. In this case, the server apparatus 11 corresponds to the information processing apparatus of the present disclosure.

According to the present disclosure, it is possible to restrict an image such that a region other than a region of a monitoring target object is concealed.

It shall be understood that the embodiments disclosed herein are illustrative and are not restrictive in all aspects. Indeed, the above-described embodiments can be implemented in various forms. The embodiments described above may be omitted, replaced, or modified in various forms without departing from the scope and spirit of the appended claims.

What is claimed is:

1. An image restriction method comprising:
acquiring image data by a capturing part, wherein the image data is obtained by capturing a space in which a monitoring target object is disposed;
acquiring capturing position data indicating a capturing position of the capturing part in the space when the monitoring target object is captured;
acquiring shape information indicating a three-dimensional shape of the monitoring target object;
specifying a disposition position of the monitoring target object in the space;
specifying a shape of the monitoring target object disposed at the disposition position with the capturing position indicated by the capturing position data as a viewpoint position, based on the capturing position data, the shape information, and the disposition position of the monitoring target object, and specifying a region of the monitoring target object in an image of the acquired image data, based on a result obtained in the specifying the shape of the monitoring target object;
performing a masking process on a region other than the specified region of the monitoring target object, in the image of the acquired image data; and
outputting mask-processed image data processed in the performing the masking process,
wherein the performing the masking process comprises generating first image data which is mask-processed by setting the region other than the specified region of the monitoring target object in the image of the image data to be transparent, and
wherein the outputting the mask-processed image data comprises outputting the first image data to a display.

2. The image restriction method according to claim 1, wherein the acquiring the shape information comprises:
specifying the three-dimensional shape of the monitoring target object from the image data obtained by capturing surroundings of the monitoring target object; and
modifying the specified three-dimensional shape of the monitoring target object according to a modification instruction to acquire the shape information.

3. The image restriction method according to claim 2, wherein the performing the masking process further comprises:
generating second image data which is mask-processed by setting the region other than the specified region of the monitoring target object in the image of the image data to be opaque,
and
wherein the outputting the mask-processed image data further comprises:
outputting the second image data to a terminal apparatus of an instructor who remotely instructs an operation on the monitoring target object.

4. The image restriction method according to claim 3, wherein the first image data and the second image data are image data created by recognizing a real space in which the monitoring target object is disposed from the acquired image data and fusing a virtual space and the real space.

5. The image restriction method according to claim 4, further comprising:
accepting designation of a range in which the monitoring target object is to be displayed,
wherein the performing the masking process performs the masking process on a region other than the accepted range in the image of the acquired image data.

6. The image restriction method according to claim 1, wherein the acquiring the shape information acquires, from a storage part that stores the shape information indicating the three-dimensional shape of the monitoring target object, the shape information according to each type of the monitoring target object captured by the capturing part.

7. The image restriction method according to claim 1, wherein the performing the masking process further comprises generating second image data which is mask-processed by setting the region other than the specified region of the monitoring target object in the image of the image data to be opaque,
and
wherein the outputting the mask-processed image data further comprises outputting the second image data to a terminal apparatus of an instructor who remotely instructs an operation on the monitoring target object.

8. The image restriction method according to claim 1, further comprising:
accepting designation of a range in which the monitoring target object is to be displayed,
wherein the performing the masking process performs the masking process on a region other than the accepted range in the image of the acquired image data.

9. A non-transitory computer-readable recording medium recording an image restriction program for causing a computer to execute a process comprising:
acquiring image data by a capturing part, wherein the image data is obtained by capturing a space in which a monitoring target object is disposed;
acquiring capturing position data indicating a capturing position of the capturing part in the space when the monitoring target object is captured;
acquiring shape information indicating a three-dimensional shape of the monitoring target object;
specifying a disposition position of the monitoring target object in the space;
specifying a shape of the monitoring target object disposed at the disposition position with the capturing position indicated by the capturing position data as a viewpoint position, based on the capturing position data, the shape information, and the disposition position of the monitoring target object, and specifying a region of the monitoring target object in an image of the acquired image data, based on a result obtained in the specifying the shape of the monitoring target object;
performing a masking process on a region other than the specified region of the monitoring target object, in the image of the acquired image data; and
outputting mask-processed image data processed in the performing the masking process,
wherein the performing the masking process comprises generating first image data which is mask-processed by setting the region other than the specified region of the monitoring target object in the image of the image data to be transparent, and
wherein the outputting the mask-processed image data comprises outputting the first image data to a display.

10. An information processing apparatus comprising:
- an image acquisition part configured to acquire image data by a capturing part, wherein the image data is obtained by capturing a space in which a monitoring target object is disposed;
- a capturing position acquisition part configured to acquire capturing position data indicating a capturing position of the capturing part in the space when the monitoring target object is captured;
- a shape acquisition part configured to acquire shape information indicating a three-dimensional shape of the monitoring target object;
- a position specifying part configured to specify a disposition position of the monitoring target object in the space;
- a region specifying part configured to specify a shape of the monitoring target object disposed at the disposition position with the capturing position indicated by the capturing position data as a viewpoint position, based on the capturing position data acquired by the capturing position acquisition part, the shape information acquired by the shape acquisition part, and the disposition position of the monitoring target object specified by the position specifying part, and configured to specify a region of the monitoring target object in an image of the image data acquired by the image acquisition part, based on a result obtained by the specifying the shape of the monitoring target object;
- a masking processor configured to perform a masking process on a region other than the specified region of the monitoring target object specified by the region specifying part, in the image of the image data acquired by the image acquisition part; and
- an output part configured to output image data which is mask-processed by the masking processor,
- wherein the masking processor is configured to generate first image data which is mask-processed by setting the region other than the specified region of the monitoring target object in the image of the image data to be transparent, and
- the output part is configured to output the first image data to a display part.

11. The information processing apparatus according to claim 10, wherein the shape acquisition part is configured to specify the three-dimensional shape of the monitoring target object from the image data obtained by capturing surroundings of the monitoring target object, and modify the specified three-dimensional shape of the monitoring target object according to a modification instruction to acquire the shape information.

12. The information processing apparatus according to claim 11, wherein the masking processor is configured to generate second image data which is mask-processed by setting the region other than the specified region of the monitoring target object in the image of the image data to be opaque, and
- the output part is configured to output the second image data to a terminal apparatus of an instructor who remotely instructs an operation on the monitoring target object.

13. The information processing apparatus according to claim 12, wherein the first image data and the second image data are image data created by recognizing a real space in which the monitoring target object is disposed from the acquired image data and fusing a virtual space and the real space.

14. The information processing apparatus according to claim 13, further comprising:
- a reception part configured to accept designation of a range in which the monitoring target object is to be displayed,
- wherein the masking processor performs the masking process on a region other than the range accepted by the reception part in the image of the image data acquired by the image acquisition part.

15. The information processing apparatus according to claim 14, wherein the information processing apparatus is configured to communicate with a wearable device worn by an operator who performs an operation on the monitoring target object in a wired or wireless manner to control the wearable device.

16. The information processing apparatus according to claim 10, wherein the shape acquisition part is configured to acquire, from a storage part that stores the shape information indicating the three-dimensional shape of the monitoring target object, the shape information according to each type of the monitoring target object captured by the capturing part.

17. The information processing apparatus according to claim 10, wherein the masking processor is configured to generate second image data which is mask-processed by setting the region other than the specified region of the monitoring target object in the image of the image data to be opaque state, and
- the output part is configured to output the second image data to a terminal apparatus of an instructor who remotely instructs an operation on the monitoring target object.

18. The information processing apparatus according to claim 10, further comprising:
- a reception part configured to accept designation of a range in which the monitoring target object is to be displayed,
- wherein the masking processor performs the masking process on a region other than the range accepted by the reception part in the image of the image data acquired by the image acquisition part.

19. The information processing apparatus according to claim 10, wherein the information processing apparatus is configured to communicate with a wearable device worn by an operator who performs an operation on the monitoring target object in a wired or wireless manner to control the wearable device.

20. A support system comprising:
- an operator terminal of an operator who performs an operation on a monitoring target object;
- a terminal apparatus of an instructor who remotely instructs the operation on the monitoring target object; and
- a server apparatus configured to relay communication between the operator terminal and the terminal apparatus,
- wherein the terminal apparatus includes:
- an image acquisition part configured to acquire image data by a capturing part, wherein the image data is obtained by capturing a space in which the monitoring target object is disposed;
- a capturing position acquisition part configured to acquire capturing position data indicating a capturing position of the capturing part in the space when the monitoring target object is captured;

a shape acquisition part configured to acquire shape information indicating a three-dimensional shape of the monitoring target object;

a position specifying part configured to specify a disposition position of the monitoring target object in the space;

a region specifying part configured to specify a shape of the monitoring target object disposed at the disposition position with the capturing position indicated by the capturing position data as a viewpoint position, based on the capturing position data acquired by the capturing position acquisition part, the shape information acquired by the shape acquisition part, and the disposition position of the monitoring target object specified by the position specifying part, and configured to specify a region of the monitoring target object in an image of the image data acquired by the image acquisition part, based on a result obtained by the specifying the shape of the monitoring target object;

a masking processor configured to perform a masking process on a region other than the specified region of the monitoring target object specified by the region specifying part, in the image of the image data acquired by the image acquisition part; and an output part configured to output mask-processed image data processed by the masking processor, and wherein the server apparatus is configured to relay the mask-processed image data to the operator terminal, the terminal apparatus is configured to display the mask-processed image data, the masking processor is configured to generate first image data which is mask-processed by setting the region other than the specified region of the monitoring target object in the image of the image data to be transparent, and the output part is configured to output the first image data to a display part.

* * * * *